United States Patent [19]
Szerdahelyi et al.

[11] Patent Number: 5,715,630
[45] Date of Patent: Feb. 10, 1998

[54] VEHICLE DOOR

[75] Inventors: Ferenc Szerdahelyi, Coburg; Barry Edwards, Bamberg; Hans-Dieter Lieb, Coburg; Rolf Heinemann, Grossalmerode; Horst Seiler, Sonnefeld; Eberhard Pleiss, Untersiemau, all of Germany

[73] Assignee: Brose Fahrzeugteile GmbH & Co. KG, Coburg, Germany

[21] Appl. No.: 375,804

[22] Filed: Jan. 19, 1995

[30]    Foreign Application Priority Data

Jan. 19, 1994 [DE] Germany .................. 44 01 413.9

[51] Int. Cl.$^6$ ................................................ E05F 11/44
[52] U.S. Cl. ........................................... 49/351; 49/502
[58] Field of Search ......................... 49/502, 503, 351, 49/350, 349, 398; 296/146.2

[56]    References Cited

U.S. PATENT DOCUMENTS

| | | | |
|---|---|---|---|
| 4,785,585 | 11/1988 | Grier | 49/502 |
| 4,827,671 | 5/1989 | Herrengshaw et al. | 45/503 |
| 5,050,347 | 9/1991 | Brusasco | 45/502 X |
| 5,050,350 | 9/1991 | Bertolini et al. | 49/502 |
| 5,062,240 | 11/1991 | Brusasco | 49/502 X |
| 5,101,596 | 4/1992 | Moore | 49/351 |
| 5,111,620 | 5/1992 | Lau et al. | 49/502 |
| 5,226,259 | 7/1993 | Yamagata et al. | 49/502 |
| 5,251,403 | 10/1993 | Compeau et al. | 49/502 |
| 5,308,129 | 5/1994 | Hlavaty | 49/502 X |
| 5,433,041 | 7/1995 | Filippi | 45/502 |

FOREIGN PATENT DOCUMENTS 563742  10/1993  European Pat. Off. ........ B60J 5/00

*Primary Examiner*—Jerry Redman
*Attorney, Agent, or Firm*—Christie, Parker & Hale, LLP

[57]    ABSTRACT

In a vehicle door with a cross-arm type window lift and a lock assembly, which can be produced more easily and cost-effectively by employing modular construction and by using individual components for several different functions. The invention is distinguished by the guide rail of the cross-arm window lift simultaneously functioning as the support for the lock assembly, by the guide for guiding the window being integrated in the base body of the lock assembly and by the outer edge of a base plate supporting a window lift having a circumferential profiled sealing section in the interior sheet metal door panel for sealing a mounting opening, so that the protection of electrical/electronic components is provided in the dry space without additional steps.

14 Claims, 2 Drawing Sheets

VEHICLE DOOR

FIELD OF THE INVENTION

The invention relates to a vehicle door with a cross-arm type window lift and a lock assembly connected together as a multi-function modular unit, and more particularly to a preassembled mounting panel including the multi-function modular unit.

BACKGROUND OF THE INVENTION

The prior art has long recognized the desirability of manufacturing a vehicle door with the door hardware, such as the window, the window regulator and the door handles mounted on a panel to define a module which may be preassembled away from the vehicle assembly line to speed up on-line assembly and subsequent testing and setup. For technical and economical reasons the vehicle door construction should both sufficiently absorb energy and minimize the weight of the door.

An interior door panel and an exterior door panel attached together in a spaced apart relation defining a cavity is described in U.S. Pat. No. 5,111,620. The interior door panel has a plurality of openings therein and the door components are individually mounted on the interior panel within these openings by a plurality of energy-absorbing devices which are preferably comprised of convoluted straps.

European Patent Application 0 563 742 A1 describes a preassembled operating panel which is housed inside the hollow bottom portion of a vehicle door and which represents the door lock mechanisms, a device for regulating and guiding the sliding window of the door and a central load-bearing element. The central load-bearing element consists partly of a portion of the window regulating device and comprises elements for connecting the operating panel to the door lock mechanisms being fitted to the central load bearing element.

From U.S. Pat. No. 5,251,403 it is known that a mounting panel for mounting a window and a window regulator in a vehicle door is comprised of a one-piece plastic molded member having a central planar mounting member adapted to mount the window regulator, and a plurality of spaced-apart spokes molded integrally with the center drill plate and radiating generally forward and rearward therefrom to mount the guide channel receiving the edges of the window. A plurality of snap fasteners are integrally molded with the mounting panel for snap-together fastening of such door operating hardware as the window regulator, the window regulator motor, door handle and the door latch control rods.

According to U.S. Pat. No. 5,050,350, an interior vehicle door panel is provided on its face turned toward the inside of the door with means for the fastening and preassembly on this panel of internal elements of the door, in particular a window lift, a lock, a slide for guiding and locking the window in the lowered position, and inside operating controls. These elements are provided with means for fastening to a panel forming a structure inside the door. This arrangement eliminates an internal plate supporting the elements.

Although the above described prior art vehicle doors are effective in providing preassembled window lift and door lock systems, the components are each individually mounted, and no provision is made for integrating the functions of different components. Nor do the prior art vehicle doors make provision for a dry-space between a sheet metal door panel and a trim panel. The integrity of included electrical components may, therefore, be compromised unless protected by additional and expensive weather proofing.

A simple and inexpensive vehicle door with multi-functional components mounted on a base plate and attached to the door so as to form a dry-space for electrical components is, therefore, needed for more cost-effective assembly operations.

SUMMARY OF THE INVENTION

The present invention is directed to a vehicle door which is constructed from a reduced number of individual parts and/or requires less of an assembly effort and/or permits the employment of more cost-effective structural parts or structural components.

A vehicle door in accordance with the invention suitably comprises a cross-arm type window lift which includes crossed lever arms, connected together with a hinge at the crossing point. The upper ends of the lever arms are connected to a guide rail which supports a window. One lever arm is pivotally connected to a bearing and includes a gear assembly connected to its lower end adapted to engage with a pinion drive gear for raising and lowering the window. A second lever arm is slidably connected to a second guide rail which is disposed in a fixed relationship to the vehicle door. The vehicle door also comprises a lock assembly, wherein the second guide rail of the window lift also supports the lock assembly, eliminating an otherwise customary separate support of the lock assembly. This not only results in the elimination of a structural component, but also leads to a reduction of tolerance deviations and a savings in weight and assembly cost.

In one embodiment of the invention, the lock assembly is movable along a major direction of the second guide rail by inserting more or less of an end of the second guide rail into a receiving cavity provided in a base body of the lock assembly. In an alternative embodiment of the invention, the guide rail is seated in a limitedly displaceable manner on a support plate, in which case the lock assembly is then fixed in place on the end of the guide rail. The displaceability of the lock assembly with respect to the body of the door is advantageous for compensating for manufacturing tolerances when finally assembling the door.

In a further embodiment of the invention, a vehicle door with a window which can be raised and lowered and with a lock assembly for unlocking and locking the door includes a lock assembly base body which further includes window guide means which support and guide a portion of the lateral window edge, the window guide means being integrated into the base body of the lock assembly.

In particular, the base body of the lock assembly and the guide means for the window are constructed as a one-piece component from a suitable material such as plastic. In addition, the window guide means can be constructed to extend in length beyond the outer contour of the base body of the lock assembly. The window guide means, integrated in the lock assembly, and lengthened in this way can result in the elimination of the conventional guide rails disposed in the door. The lengthened window guide means and the base body of the lock assembly are constructed in two pieces and connected together. The connection between the window guide means and the base body of the lock assembly is made to be resilient. In this way it is possible to compensate not only for manufacturing tolerances, but also unavoidable elastic stresses in the door.

In yet a further embodiment of the invention, a vehicle door is constructed with a cross-arm type window lift preassembled on a base plate which is installed inside the door body through a mounting opening in an interior sheet metal door panel. The base plate covers the mounting opening and completely seals the mounting opening by means of a circumferential seal placed around the outer edge of the base plate thereby forming a dry space between the interior sheet metal door panel and an interior door covering, as well as a wet space between the interior and the exterior sheet metal door panels. In particular, when the contour of the outer edge follows a complicated course, a profiled seal is formed directly on the outer edge of the base plate.

Preferably, when using an electrical drive element for operating the window lift, all current-carrying parts such as the electric motor, any electronic components, switches, and the plugs and cables, are mounted in the dry space. A seal is disposed between the housing of the drive element and the base plate in the area where the drive shaft passes through from the dry space to the wet space. To the extent that further openings are provided in the base plate, for example, for adjusting the window, these are sealingly closed following their use.

The base plate can also be used as a transport assistance means for transporting parts of the door lock which, for example, are connected with each other via suitable plug connections.

BRIEF DESCRIPTION OF THE DRAWINGS

These and other features, aspects and advantages of the present invention will be more fully understood when considered with respect to the following detailed description, appended claims, and accompanying drawings, wherein:

FIG. 1A is a semi-schematic elevational view of a two-piece lock assembly including a base body and a separate lateral window guide;

DETAILED DESCRIPTION OF THE INVENTION

Figure 1:
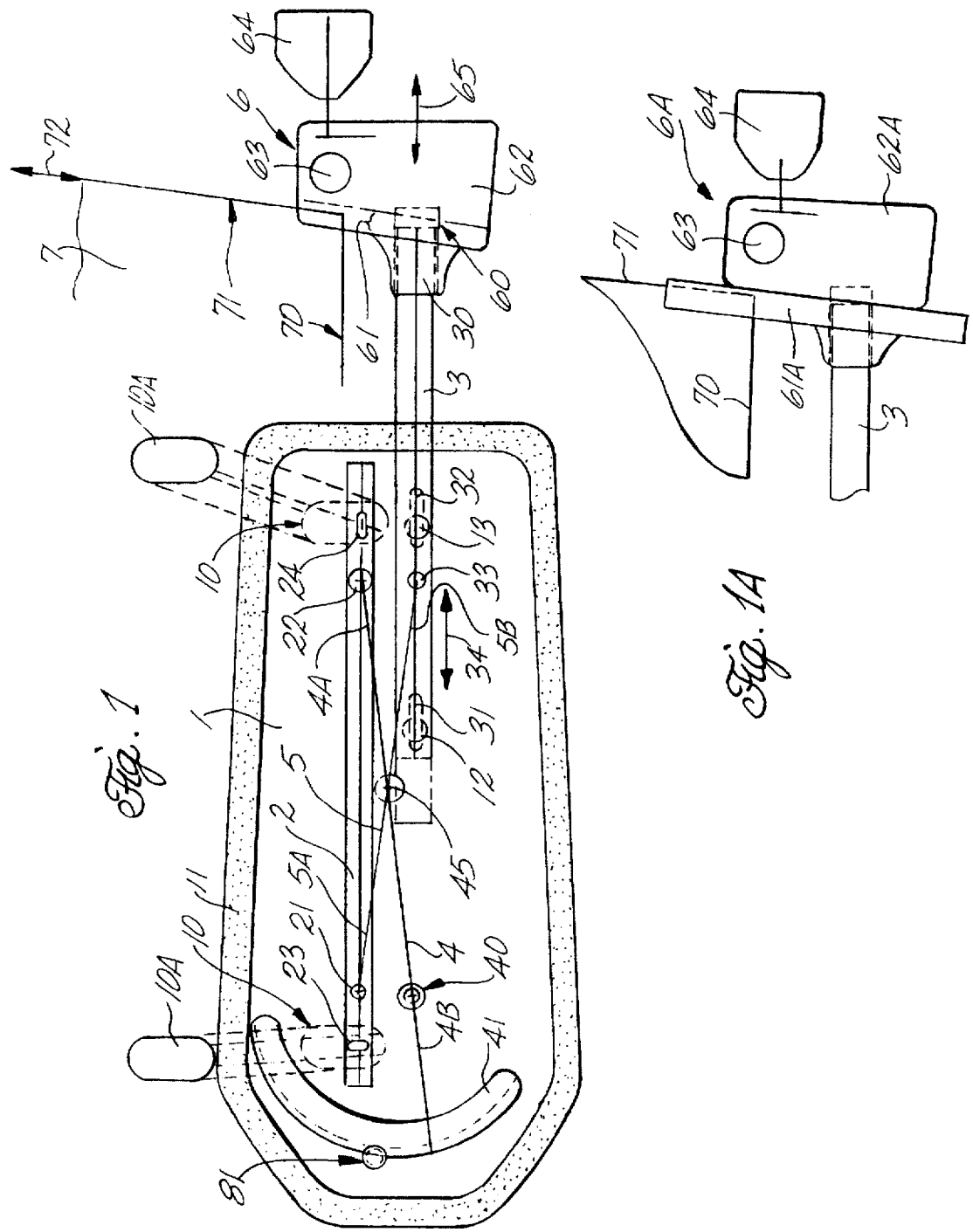
FIG. 1 is a schematic elevational view of a cross-arm window lift mounted on a base plate and connected with a lock assembly.

A schematic diagram of a cross-arm window lift is depicted in FIG. 1, in which crossed levers 4, 5 are connected together at a hinge point 45. The upper ends, 4A and 5A respectively, of each lever arm are connected at sliding hinge points 21, 22 with a guide rail 2 on which a window lift rail (not shown) is fastened. The window lift rail is a part of the lower edge 70 of a window 7. Elongated alignment holes 23, 24 are provided in the guide rail 2 for adjusting the alignment of the window in the door and for simultaneously compensating for manufacturing tolerances.

The lever 4 is rotatably supported below the hinge point 21 in a bearing 40. The bearing 40 is embedded, or otherwise mounted on a base plate 1, which is not only used as a support, but also for sealing a mounting opening 110 in an interior sheet metal door panel 100 (also see FIG. 2). The lower end 4B of the lever 4 which extends past the bearing 40 is attached to a gear assembly which comprises a toothed gear segment 41 whose tooth elements engage and mesh with the teeth of a pinion drive gear 81 for raising and lowering the window.

The lower end 5B (below the hinge point 45) of the other lever 5 i.e., the portion of the lever 5 below the hinge point 45, is slidingly supported in a guide rail 3 at a hinge point 33. The guide rail 3 is fixed or can be fixedly fastened on the base plate 1, in the same manner as the bearing 40. When the base plate is attached to the vehicle door, in a manner described further below, the guide rail 3 is, thereby, located in a fixed relationship to the vehicle door.

In operation, the pinion drive gear 81 is rotated by, for example, a hand operated crank or an electric motor, when the window is desired to be raised or lowered. The pinion gear teeth engage the teeth of gear assembly 41 which moves the gear assembly attached to the lower end of lever arm 4, thus rotating lever arm 4 about the bearing 40. As the lever arm 4 is rotated, its upper end 4A exerts an upward force on the upper guide rail 2 which transfers the force to the window 7, thus raising it.

In order to maintain an even support on the lower edge of the window, the lower end 5B of lever arm 5 is supported in the lower guide rail 3, which is maintained in fixed relationship to the vehicle door. As the window is raised, the two lever arms pivot about the hinge 45 in scissor fashion; the upper ends 5A and 5B of the lever arms sliding towards one another, along the major length direction of the upper guide rail 2, while the lower end 5B of lever arm 5 slides along the major direction of lower guide rail 3 (its length direction). Any downward force exerted by the lower end of lever arm 5 is opposed by the fixed guide rail 3. Since the lever arms 4 and 5 are both fixed at portions below the hinge 45, at least with respect to vertical movement, but are free to move at their upper portions, only the upper guide rail 2 moves, thus raising or lowering the window.

In accordance with the invention, the guide rail 3 extends in a major direction beyond its functional range needed for supporting lever arm 5, and is connected with a lock assembly 6. In this way the guide rail 3 provides a bearing function in respect to the lock assembly 6 which, in conventional vehicle doors, is provided by a separate lock support. In general, a base body 62 with a lock cylinder 63, a locking/unlocking element (not shown), and a handle 64 for operating the element are a part of the lock assembly.

Since the lock assembly 6 must, at some point, be attached to the vehicle door, and since the lock assembly attachment points of vehicle doors often have varying manufacturing tolerances, the lock assembly must be displaceable to the degree necessary to compensate for those tolerances.

Two basic variants are available to make possible the desired displaceability of the lock assembly 6. In one embodiment, a guide channel 60 is provided in the base body 62 of the lock assembly 6, into which an end 30 on the lock side of the fixed guide rail 3 can be inserted. The lock assembly 6 is moveable along the major axis of fixed guide rail 3 (displacement direction 65, shown in FIG. 1) depending on the degree of insertion of the guide rail end 30 into the guide channel 60. Guide channel 60, therefore, provides means for compensating for tolerances when the lock assembly is fastened to the door body.

In an alternative embodiment, the lock assembly 6 is fixedly seated on a moveable guide rail 3. Displaceability (displacement direction 34, shown in FIG. 1) of the assembly is accomplished by movably connecting the guide rail 3 on the base plate 1. Slots 31 and 32 are cut into the guide rail 3, which are engaged by two cap bolts 12 and 13 fastened on the base plate 1, thus allowing the assembly to move, along displacement direction 34, through a range defined by slots 31 and 32.

Guide rail 3 is preferably constructed as a one-piece structural part, having a constant, unbroken, profile. Suitable materials for fabricating such a guide rail include those produced by extrusion molding, extruding or rolling, such as aluminum, plastic or other organic or inorganic composites.

Although both displacement variations have been depicted for the sake of improved visualization, it will be understood that either one, alone, can be used for purposes of the invention. The one which best meets the practical requirements will preferably be selected.

It should also be pointed out that the guide rail, neither needs to have a continuously uniform profile nor does it need to extend in a straight line (as illustrated). A multi-section guide rail 3, with each section having a different profile, can also be employed. Such a multi-section guide rail can be advantageously employed in cases where a direct link between the window lift and the lock assembly is not possible, for example where the guide rail must be routed around a projecting piece of unrelated equipment. Such a guide rail is suitably fabricated of a stamped material such as a Low cost metal.

Figure 2:
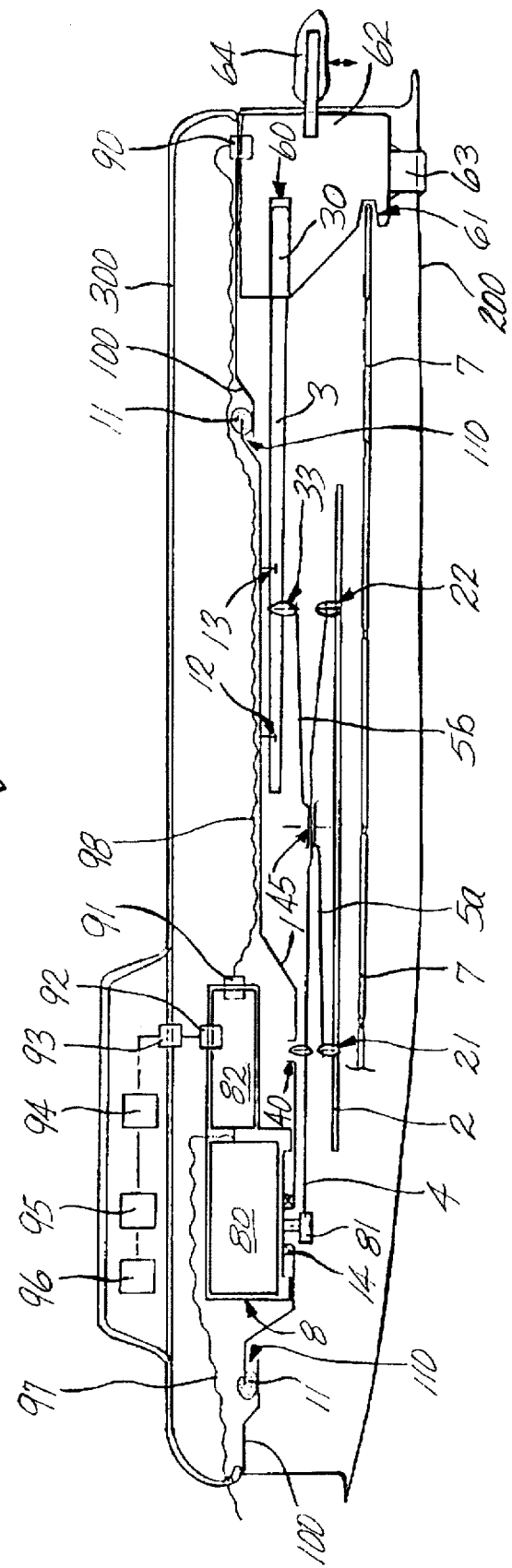
FIG. 2 is a semi-schematic cross-sectional view taken horizontally through a vehicle door body equipped with the components of FIG. 1.

In accordance with the invention, the base body 62 of the lock assembly 6 is provided with guide means 61 for supporting and guiding the edge of window 7. As depicted in FIGS. 1 and 2, guide means 61 suitably comprises a channel-like cross section provided in connection with base body 62. Guide means 61 and the base body 62 are constructed as a one-piece component which is advantageously manufactured of an extruded or cast material. Alternatively as depicted in FIG. 1A, a separate guide means 61A can be provided which is then attached to the base body 62A, forming a multi-piece assembly. In this embodiment, both the base body and the guide means may be constructed of different materials. For example, if the guide means are expose to large stress forces, the guide means 61A may be constructed of metal, while the base body 62A of the lock assembly 6A may constructed of a low cost, low weight material such as plastic.

It is of course also possible to extend the window guide means 61A lengthwise, past the upper and/or lower contour of the base body 62A, thus providing a longer contact surface between the window and the guide means. This allows the elimination of the conventional window guide rails disposed in the door. In this embodiment, guide means is elastically connected to the base body by a resilient material in order to allow the guide means to flex in response to window motion, thus compensating for manufacturing tolerances and unavoidable elastic stresses in the door.

With a two-piece guide means, the guide means can be constructed of a suitable material, such as an extruded plastic, when the guide means are intended to perform mainly guide functions. When a stronger guide means is desirable, such as when it also performs supporting functions, it can be manufactured of a suitable metal or composite material. The choice of plastics, metals, a combination of materials or even composite materials to construct the guide means is, therefore, a function of the requirements and stresses of the respective use.

With the use of modular construction, it is furthermore advantageous to provide a base plane 1, supporting a window lift, with a circumferential seal 11. As depicted in FIG. 2, such a base plate preferably has a circumferential profile such that, when attached to a mounting opening 110 located in an interior sheet metal door panel 100, the base plate 1 covers the mounting opening 110 and the circumferential seal 11 provides for complete sealing of the mounting opening 110. In This manner a so-called dry space, between the interior sheet metal door panel 100 and an interior door covering 300, such as a trim panel, is created. At the same time, a so-called wet space, between the interior and exterior sheet metal door panels 100 and 200, is created without any additional manufacturing steps. Profiled rubber pieces, constructed as a single piece which can be placed on outer edge of the base plate 1, are particularly suited for use as a seal when the base plate outer edge has a simple shape, free of discontinuities. For shapes with complicated edges, the sealing material can be sprayed or adhesively affixed to the base plate edges.

Openings (10 of FIG. 1) are provided in the base plate for providing access to mounting points for fastening and adjusting mountable components, for example, the window 7. Integrity of the base plate is maintained by sealing the openings with a cover 10A constructed from a suitable deformable material, such as a rubber panel or plastic cover, which is press-fit into the opening.

Returning to FIG. 2, electrical cables 97, 98 and structural parts or structural components, such as an electric window lift motor/drive assembly 80, electronic unit 82, switches 94, 95, 96 and plugs 90, 91, 92, 93 (see FIG. 2), through which current flows, are disposed in the dry space. It is of course also necessary to provide sufficient sealing by means of a seal 14 in the area where the drive shaft with the pinion 81 passes through. The disposition in the dry space of the electric and electronic components allows the elimination of the usually very elaborate steps for protection against the entry of moisture. With a suitable disposition of the base body 62 of the lock assembly 6, a plug connection 90 for the central locking can be placed in the dry space.

An increase in the degree of integration of the module comprising the base plate 1, the window lift and possibly the lock assembly 6 can be achieved in that the base plate 1 is equipped with transport means, suitably comprising plug or clip connectors, which are connected to the base plate and which support the mechanical operating parts for the interior unlocking and locking mechanism of the vehicle door. The mechanical operating parts for the interior unlocking and locking mechanism are pre-assembled on the base plate by connection to the transport assistance means. The entire assembly can, therefore, be transported to the assembly line as a one-piece unit. Such transport assistance means can considerably reduce manipulative efforts.

The above descriptions of preferred embodiments in accordance with the present invention are for illustrative purposes. Because of variations which will be apparent to those skilled in the art, the present invention is not intended to be limited to the particular embodiments described above. The scope of the invention is defined in the following claims.

What is claimed is:

1. A vehicle door comprising:
   (a) a cross-arm type window lift for raising and lowering a window comprising:
      (i) at least first and second lever arms having upper and lower ends and disposed in crossing fashion, the lever arms being hingedly connected at a crossing point;
      (ii) a displaceable first guide rail connected to the window and adapted to slidably receive an upper end of each lever arm;
      (iii) a bearing, mounted in fixed relationship to the vehicle door, the bearing pivotally attached to the first lever arm at a location between said crossing point and its lower end;
      (iv) a gear assembly, attached to the lower end of the first lever arm, the gear assembly having a generally convex outer surface which supports a toothed portion adapted to engage and mesh with teeth of a pinion drive gear; and (v) a second guide rail adapted to slidably receive the lower end of the second lever arm; and (b) a lock assembly, wherein the lock assembly is connected to the second guide rail.

2. The vehicle door according to claim 1, wherein the lock assembly is movably connected to the second guide rail, the lock assembly being moveable along a major direction of the second guide rail.

3. The vehicle door according to claim 1, wherein the second guide rail is moveable in its major direction, the lock assembly being fixed to an end of the second guide rail.

4. The vehicle door according to claim 1 wherein the lock assembly includes means for compensating for tolerances when the lock assembly is fastened to the vehicle door.

5. A vehicle door according to claim 1, wherein the second guide rail is a one-piece structural part.

6. A vehicle door according to claim 5, wherein the second guide rail has a constant profile and is constructed of a material selected from the group consisting of extrusion molding material, extruded material, and rolled material.

7. A vehicle door according to claim 5, wherein the second guide rail is constructed of a stamped material, the material having sections, each section having a different profile.

8. A vehicle door according to claim 1, wherein the second guide rail includes at least two portions, one portion slidably receiving the lower end of the second lever arm, the other portion supporting the lock assembly.

9. A vehicle door having interior and exterior sheet metal door panels which define an interior space therebetween, the interior door panel including a mounting opening, the vehicle door comprising:

(a) a window lift for raising and lowering a window;

(b) a base plate disposed adjacent the mounting opening and constructed so as to cover the mounting opening, the window lift being preassembled on the base plate for insertion into the interior space of the door, the base plate including openings for providing access to adjustable components, the openings being sealed by insertable seals; and (c) a circumferential profiled seal disposed on an outer edge of the base plate for sealing the mounting opening in the interior sheet metal door panel.

10. A vehicle door according to claims 9, wherein the insertable seals comprise a panel constructed of a deformable material which is press-fit into the base plate openings.

11. A vehicle door including a window lift for raising and lowering a window, the vehicle door further including a lock assembly for locking and unlocking the vehicle door, the lock assembly having a base body including an outer contour for supporting components of the lock assembly, wherein the base body of the lock assembly includes a channel-shaped lateral window guide integrated with the base body of the lock assembly for laterally guiding the window during raising and lowering, wherein the lateral window guide extends beyond the outer contour of the base body, and wherein the lateral window guide is elastically connected to the base body of the lock assembly.

12. A vehicle door including a window lift for raising and lowering a window, the vehicle door further including a lock assembly for locking and unlocking the vehicle door, the lock assembly having a base for supporting components of the lock assembly, wherein the base body of the lock assembly includes guide means for laterally guiding the window during raising and lowering, the guide means comprising a channel-shaped lateral window guide integrated with the base body of the lock assembly, the base body defining an outer contour, the lateral window guide extending beyond said outer contour of the base body, wherein the lateral window guide is elastically connected to the base body of the lock assembly.

13. A vehicle door having interior and exterior sheet metal door panels which define an interior space therebetween, the interior door panel including a mounting opening, the vehicle door comprising:

a window lift for raising and lowering a window;

a base plate having an outer edge and disposed adjacent the mounting opening the base plate sized to cover the mounting opening, the window lift being preassembled on the base plate for insertion into the interior space of the door, the base plate including access openings for providing access to adjustable components, the openings being covered by removable coverings, the coverings sealing the openings against moisture; and a circumferential profiled seal disposed on the outer edge of the base plate for sealing the mounting opening in the interior sheet metal door panel.

14. A vehicle door according to claim 13, wherein the removable coverings comprise a panel constructed of a deformable material, the coverings adapted for press-fit insertion into the base plate openings.

* * * * *

UNITED STATES PATENT AND TRADEMARK OFFICE
CERTIFICATE OF CORRECTION

PATENT NO. : 5,715,630
DATED : February 10, 1998
INVENTOR(S) : Ferenc Szerdahelyi; Barry Edwards; Hans-Dieter Lieb; Rolf Heinemann; Horst Seiler; Eberhard Pleiss It is certified that error appears in the above-indentified patent and that said Letters Patent is hereby corrected as shown below:

Column 3, line 36, after "guide;" insert -- and --.
Column 5, line 16, change "a Low" to -- a low --.
Column 5, line 31, change "expose" to -- exposed --.
Column 5, line 56, change "plane" to -- plate --.
Column 5, line 63, change "In This" to -- In this --.
Column 7, line 44, change "claims" to -- claim --.

Signed and Sealed this

Second Day of November, 1999

Attest:

Q. TODD DICKINSON

Attesting Officer

Acting Commissioner of Patents and Trademarks